United States Patent
Kikuchi et al.

(10) Patent No.: US 10,621,694 B2
(45) Date of Patent: Apr. 14, 2020

(54) IMAGE PROCESSING APPARATUS, SYSTEM, IMAGE PROCESSING METHOD, CALIBRATION METHOD, AND COMPUTER-READABLE RECORDING MEDIUM

(71) Applicants: Naoki Kikuchi, Kanagawa (JP); Kiichiroh Saitoh, Kanagawa (JP)

(72) Inventors: Naoki Kikuchi, Kanagawa (JP); Kiichiroh Saitoh, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/216,572

(22) Filed: Dec. 11, 2018

(65) Prior Publication Data
US 2019/0108617 A1 Apr. 11, 2019

Related U.S. Application Data

(63) Continuation of application No. 14/996,706, filed on Jan. 15, 2016, now Pat. No. 10,186,034.

(30) Foreign Application Priority Data

Jan. 20, 2015 (JP) .................. 2015-008876
Dec. 4, 2015 (JP) .................. 2015-237429

(51) Int. Cl.
G06T 3/40 (2006.01)
G01B 11/25 (2006.01)
G06T 7/80 (2017.01)
G06T 7/593 (2017.01)

(52) U.S. Cl.
CPC ........ *G06T 3/4038* (2013.01); *G01B 11/2545* (2013.01); *G06T 7/593* (2017.01); *G06T 7/85* (2017.01); *G06T 2207/10012* (2013.01); *G06T 2207/10028* (2013.01); *G06T 2207/20221* (2013.01)

(58) Field of Classification Search
CPC ............................. G06T 19/00; G01R 33/4812
See application file for complete search history.

(56) References Cited

U.S. PATENT DOCUMENTS 6,035,065 A 3/2000 Kobayashi et al.
9,170,103 B2 10/2015 Umezawa et al.
9,661,305 B2* 5/2017 Chou .................. G01B 11/254
(Continued)

FOREIGN PATENT DOCUMENTS

JP 10-214336 8/1998
JP 2011-118328 6/2011
(Continued)

OTHER PUBLICATIONS

Extended European Search Report dated Jun. 16, 2016 in Patent Application No. 16151872.5.

*Primary Examiner* — Kim Y Vu
*Assistant Examiner* — Molly Delaney
(74) *Attorney, Agent, or Firm* — Oblon, McClelland, Maier & Neustadt, L.L.P.

(57) ABSTRACT

An image processing apparatus includes: an acquisition unit that acquires a plurality of first images that correspond to a plurality of spatial frequencies on a one-to-one basis; and a generation unit that generates a second image by synthesizing the first images acquired by the acquisition unit.

13 Claims, 8 Drawing Sheets

(56) References Cited

U.S. PATENT DOCUMENTS

| | | | |
|---|---|---|---|
| 9,826,216 B1* | 11/2017 | Hazeghi | G02B 27/0075 |
| 2002/0196415 A1* | 12/2002 | Shiratani | G01B 11/25 |
| | | | 353/31 |
| 2006/0182308 A1* | 8/2006 | Gerlach | G01B 11/2545 |
| | | | 382/100 |
| 2008/0319308 A1 | 12/2008 | Tang | |
| 2009/0096783 A1 | 4/2009 | Shpunt et al. | |
| 2010/0283872 A1* | 11/2010 | Chan | G06T 1/00 |
| | | | 348/241 |
| 2011/0032499 A1* | 2/2011 | Kawashima | G03B 27/42 |
| | | | 355/53 |
| 2011/0242283 A1* | 10/2011 | Tyagi | G01B 11/2545 |
| | | | 348/46 |
| 2012/0224069 A1 | 9/2012 | Aoki | |
| 2012/0236124 A1 | 9/2012 | Aoki | |
| 2012/0308155 A1* | 12/2012 | Satoh | G09G 3/20 |
| | | | 382/274 |
| 2013/0136305 A1 | 5/2013 | Shpunt et al. | |
| 2013/0250065 A1 | 9/2013 | Aoki et al. | |
| 2013/0250068 A1 | 9/2013 | Aoki | |
| 2014/0240464 A1* | 8/2014 | Lee | G01S 17/08 |
| | | | 348/47 |

FOREIGN PATENT DOCUMENTS

| | | |
|---|---|---|
| JP | 2015-135317 | 7/2015 |
| JP | 2016-80535 A | 5/2016 |
| WO | WO 00/27131 A2 | 5/2000 |
| WO | WO 2007/105205 A2 | 9/2007 |

* cited by examiner

FIG.2

| IMAGE-CAPTURING DISTANCE | HOW CERTAIN PATTERN IMAGE APPEARS |
|---|---|
| ↑ LARGE DISTANCE | |
| MEDIUM DISTANCE | |
| SMALL DISTANCE ↓ | |

IMAGE PROCESSING APPARATUS, SYSTEM, IMAGE PROCESSING METHOD, CALIBRATION METHOD, AND COMPUTER-READABLE RECORDING MEDIUM

CROSS-REFERENCE TO RELATED APPLICATIONS

The present application is a continuation Application of U.S. application Ser. No. 14/996,706, filed Jan. 15, 2016, which claims priority to and incorporates by reference the entire contents of Japanese Patent Application No. 2015-008876 filed in Japan on Jan. 20, 2015 and Japanese Patent Application No. 2015-237429 filed in Japan on Dec. 4, 2015.

BACKGROUND OF THE INVENTION

1. Field of the Invention

The present invention relates to an image processing apparatus, a system, an image processing method, a calibration method, and a computer-readable recording medium.

2. Description of the Related Art

In one three-dimensional measurement technique called the stereo method, a block of pixels that is correlated with a block of pixels in an image captured with one camera is found in an image captured with another camera (points corresponding to each other are extracted), and distance data is calculated based on parallax, which indicates a relative positional difference between the two images, based on the principle of triangulation. One technique is known that uses a pattern having a lot of feature points (for example, a random pattern including irregular patterns) to increase the density of extraction of corresponding points in the aim of improving accuracy of the distance data calculation.

For example, Japanese Laid-open Patent Publication No. 2011-118328 discloses a technique for cutting out (removing) a low-frequency component contained in a random pattern in the aim of improving uniformity and dispersibility.

However, conventional techniques are configured to generate a random pattern without consideration given to the image-capturing distance (the distance between a camera and the random pattern in image capturing), and consequently are disadvantageous because of their inability to stably extract feature points.

SUMMARY OF THE INVENTION

It is an object of the present invention to at least partially solve the problems in the conventional technology.

According to exemplary embodiments of the present invention, there is provided an image processing apparatus comprising: an acquisition unit that acquires a plurality of first images that correspond to a plurality of spatial frequencies on a one-to-one basis; and a generation unit that generates a second image by synthesizing the first images acquired by the acquisition unit.

Exemplary embodiment of the present invention also provides an image processing method comprising: acquiring a plurality of first images that correspond to a plurality of spatial frequencies on a one-to-one basis; and generating a second image by synthesizing the first images acquired at the acquiring.

Exemplary embodiment of the present invention also provides a non-transitory computer-readable recording medium that contains a computer program that causes a computer to execute: acquiring a plurality of first images that correspond to a plurality of spatial frequencies on a one-to-one basis; and generating a second image by synthesizing the first images acquired at the acquiring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic view illustrating one example of the relation between how a certain pattern image contained in a captured image appears and the image-capturing distance;

DETAILED DESCRIPTION OF THE PREFERRED EMBODIMENTS

The following describes an image processing apparatus, a system, an image processing method, a calibration method, and a computer-readable recording medium having a computer program according to the present invention in detail with reference to the drawings. In the following description, a pattern projecting apparatus, which is one form of an image projection apparatus, is given as an example of an image processing apparatus to which the present invention is applied. However, the present invention is not limited to this example.

Figure 1:
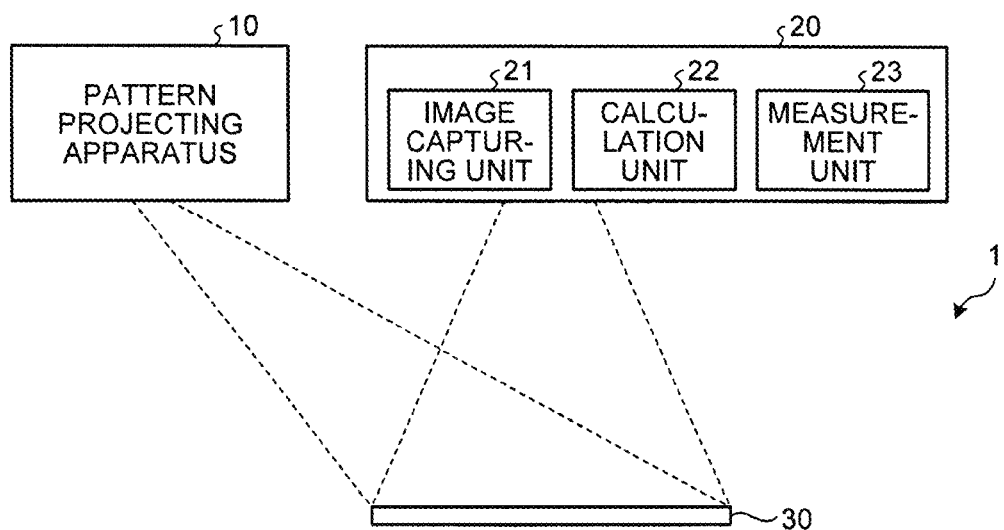
FIG. 1 is a diagram illustrating one example of the configuration of a system according to an embodiment of the present invention.

FIG. 1 is a diagram illustrating one example of the configuration of a system 1 according to an embodiment of the present invention. As illustrated in FIG. 1, the system 1 according to this embodiment includes a pattern projecting apparatus 10 and a three-dimensional measurement apparatus 20.

The pattern projecting apparatus 10 projects light based on a second image (to be described later) to a surface of a subject tool 30 (one example of a subject) for use in determining correction parameters for correcting coordinate values of a captured image. The correction parameters are to be described later. Consequently, a projection image representing the second image to be described later is formed on the surface (projection surface) of the subject tool 30. From another point of view, this formation can be considered in such a manner that the second image to be described later is displayed on the subject tool (target object) 30 by the pattern projecting apparatus 10. The detailed configuration of the pattern projecting apparatus 10 is to be described later.

Using a stereo camera composed of a pair of cameras, the three-dimensional measurement apparatus 20 finds a block of pixels correlated with a block of pixels in an image (sometimes referred to as "captured image" in the following description) obtained by image capturing with one camera, in an image obtained by image capturing with another camera, and calculates distance data from parallax, which is a relative positional difference between the two images, based on the principle of triangulation. As used herein, "image capturing" means converting an image of a subject (a subject the image of which is captured) into an electric signal after the image is formed by an optical system such as a lens.

In this embodiment, the three-dimensional measurement apparatus 20 includes an image capturing unit 21, a calculation unit 22, and a measurement unit 23. The image capturing unit 21 captures images of the subject tool 30 on which the second image to be described later is being displayed. In this example, the image capturing unit 21 is composed of a stereo camera.

Based on captured images each containing an image of the subject tool 30 and on the distance (a known distance) between the image capturing unit 21 and the subject tool 30, the calculation unit 22 calculates correction parameters for correcting a captured image obtained by image capturing with the image capturing unit 21. Various publicly known techniques are usable as a method for calculating these correction parameters. For example, methods such as those disclosed in Japanese Patent No. 4109077 and Japanese Patent No. 4501239 are usable. In this embodiment, the calculation unit 22 calculates correction parameters (first correction parameters) for correcting a captured image obtained by image capturing with one (a first camera) of the cameras included in the stereo camera, and correction parameters (second correction parameters) for correcting a captured image obtained by image capturing with the other one (a second camera), separately.

The measurement unit 23 measures distance data, based on corrected images obtained by correcting, by use of the correction parameters calculated by the calculation unit 22, the captured images obtained by image capturing with the image capturing unit 21. Various publicly known techniques are usable as a method for calculating this distance data. For example, a parallax value is calculated through a matching process using Sum of Absolute Differences (SAD), Normalized Cross Correlation (NCC), or the like, and is converted into a distance as needed. In this embodiment, the measurement unit 23 can calculate parallax between: a first corrected image obtained by correcting, with the first correction parameter, the captured image obtained by image capturing with the first camera; and a second corrected image obtained by correcting, with a second correction parameter, the captured image obtained by image capturing with the second camera. The measurement unit 23 can then generate and output a parallax image (a depth map) indicating respective depths of pixels in one of the first corrected image and the second corrected image that serves as a benchmark.

Next, the configuration of the pattern projecting apparatus 10 is described. Prior to the specific description thereof, the characteristics of the pattern projecting apparatus 10 according to this embodiment are outlined here. FIG. 2 is a schematic view of one example of the relation between: how any desired pattern image (a pattern image including a number of feature points, referred to as a "certain pattern image" for the convenience of explanation) appears that is contained in an image captured when an image of the subject tool 30 having the certain pattern image displayed thereon is captured with the image capturing unit 21 of the above-described three-dimensional measurement apparatus 20; and the image-capturing distance (the distance between the image capturing unit 21 and the subject tool 30 in the image capturing). In the example of FIG. 2, it is assumed that the certain pattern image displayed on the subject tool 30 can be accurately recognized when the image-capturing distance is set to a medium distance. In other words, it is assumed that a spatial frequency corresponding to the certain pattern image in this case is expressed as a value that allows accurate recognition of the certain pattern image when the image-capturing distance is set to a medium distance.

When the image-capturing distance is x times larger, an object appearing in the captured image appears 1/x times in size, that is, patterns contained in the certain pattern image can be observed as finer patterns because the spatial frequency is x times the original value thereof. Therefore, in the example of FIG. 2, when the image-capturing distance is larger than the medium distance (is set to a large distance), patterns contained in the certain pattern image are observed as finer patterns. Consequently, the individual patterns are united and unrecognizable, and the certain pattern image has a reduced contrast. To the contrary, when the image-capturing distance is smaller than the medium distance (is set to a small distance), only a part of the certain pattern image can be viewed. When the image-capturing distance is smaller than a distance at which one pattern (for example, a black rectangle) covers several tens of pixels (where one pixel represents the size of one pixel), the central portion of this pattern is seen without a feature (which is representatively a change in gray value), and feature points cannot be extracted. Therefore, when the distance (the image-capturing distance) between the subject tool 30 having the certain pattern image displayed thereon and the image capturing unit 21 is larger than the medium distance (set to a large distance) or smaller than the medium distance (set to a small distance), there arises the problem that highly accurate calibration (correction) of captured images and highly accurate calculation of distance data are impossible because feature points cannot be stably extracted. More specifically, there arises the problem that accurate calculation of parameters by the calculation unit 22 and accurate measurement of distances by the measurement unit 23 are impossible.

To overcome these problems, the pattern projecting apparatus 10 in this embodiment is configured to project one pattern image including spatial frequency components (patterns) that are suitable for respective distances. More specifically, when the image-capturing distance is expected to be smaller than the medium distance, the pattern projecting apparatus 10 projects one pattern image that includes a spatial frequency component smaller than that for the medium distance (a spatial frequency component suitable for a distance smaller than the medium distance). To the contrary, when the image-capturing distance is expected to be larger than the medium distance, the pattern projecting apparatus 10 projects one pattern image that includes a spatial frequency component larger than that for the medium distance (a spatial frequency component suitable for a distance larger than the medium distance). Consequently, feature points can be stably extracted despite a change in image-capturing distance because a pattern corresponding to a spatial frequency that is suitable for the changed image-capturing distance appears as a feature. Here, because a spatial frequency suitable for each distance depends also on factors such as a lens field angle and an extraction range from which feature points are extracted, frequencies favorable for feature point extraction at different distances are selected as appropriate in the three-dimensional measurement apparatus 20. The specific configuration of the pattern projecting apparatus 10 according to this embodiment is described next.

Figure 3:
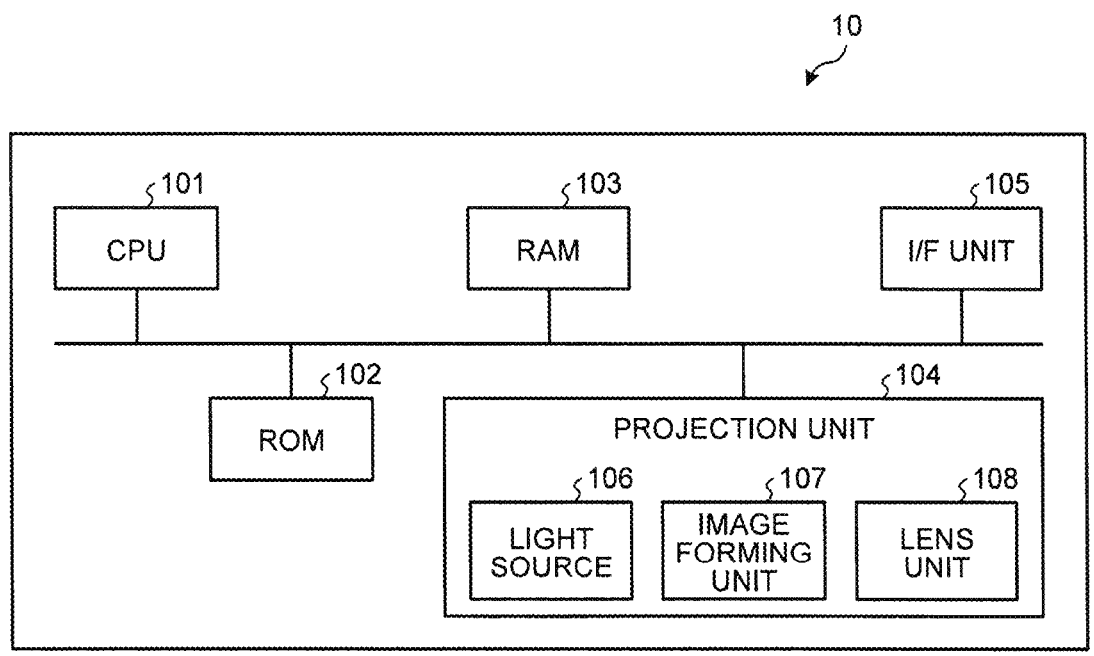
FIG. 3 is a diagram illustrating one example of the hardware configuration of a pattern projecting apparatus.

FIG. 3 is a diagram illustrating one example of the hardware configuration of the pattern projecting apparatus 10. As illustrated in FIG. 3, the pattern projecting apparatus 10 includes a central processing unit (CPU) 101, a read only memory (ROM) 102, a random access memory (RAM) 103, a projection unit 104, and an I/F unit 105.

The CPU 101 integrally controls operation of the pattern projecting apparatus 10.

The ROM 102 is a non-volatile memory that stores thereon various kinds of data such as a computer program.

The RAM 103 is a volatile memory that functions as a work area for various kinds of arithmetic processing that the CPU 101 executes.

Under the control of the CPU 101, the projection unit 104 projects light based on a projection-use image (in this example, the second image to be described later) to a projection-target object. In the example of FIG. 3, the projection unit 104 includes a light source 106, an image forming unit 107, and a lens unit 108. Light emitted from the light source 106 is supplied to the image forming unit 107. The image forming unit 107 has the function of converting the light supplied thereto by the light source 106 into light based on a projection-use image (the second image to be described later) and then outputting the resultant light to the lens unit 108. For example, the image forming unit 107 may be a transmissive liquid crystal device, or may be a reflective liquid crystal device, a digital micro mirror device (DMD), or the like. The lens unit 108 projects the light output from the image forming unit 107 toward the projection-target object. The lens unit 108 is composed of optical elements such as a plurality of lenses, a prism, and a mirror.

The I/F unit 105 is an interface for connection with an external apparatus.

Figure 4:
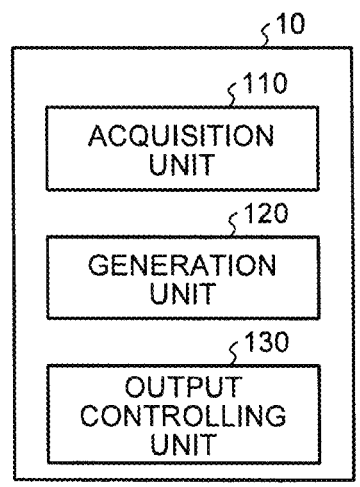
FIG. 4 is a diagram illustrating exemplary functions in the pattern projecting apparatus.

FIG. 4 is a diagram illustrating exemplary functions in the pattern projecting apparatus 10 according to this embodiment. As illustrated in FIG. 4, the pattern projecting apparatus 10 includes an acquisition unit 110, a generation unit 120, and an output controlling unit 130. For the convenience of explanation, FIG. 4 mainly illustrates the functions related to the present invention. However, functions in the pattern projecting apparatus 10 are not limited to these functions.

Furthermore, although the functions (the acquisition unit 110, the generation unit 120, and the output controlling unit 130) in the pattern projecting apparatus 10 in this embodiment are implemented when the CPU 101 executes a computer program stored in the ROM 102 or the like, the embodiment is not limited to this example. For example, in one implementation, at least part of the functions in the pattern projecting apparatus 10 may be implemented by a dedicated hardware circuit (such as a semiconductor integrated circuit).

The acquisition unit 110 acquires a plurality of first images that correspond to a plurality of spatial frequencies on a one-to-one basis. More specifically, each of the first images includes at least a component (a pattern) of the spatial frequency corresponding thereto. In this embodiment, the acquisition unit 110 generates an original image by randomly determining pixel values of a plurality of pixels included in an image region having a size different from the size of each first image. The acquisition unit 110 then generates one of the first images that corresponds to one spatial frequency of the spatial frequencies by resizing the original image to the size of each first image. In this example, the size of the image region is smaller than that of each first image, and the acquisition unit 110 enlarges the generated original image to the size of the first image and can thus generate a first image that corresponds to one spatial frequency of the spatial frequencies.

Figures 5, 6:
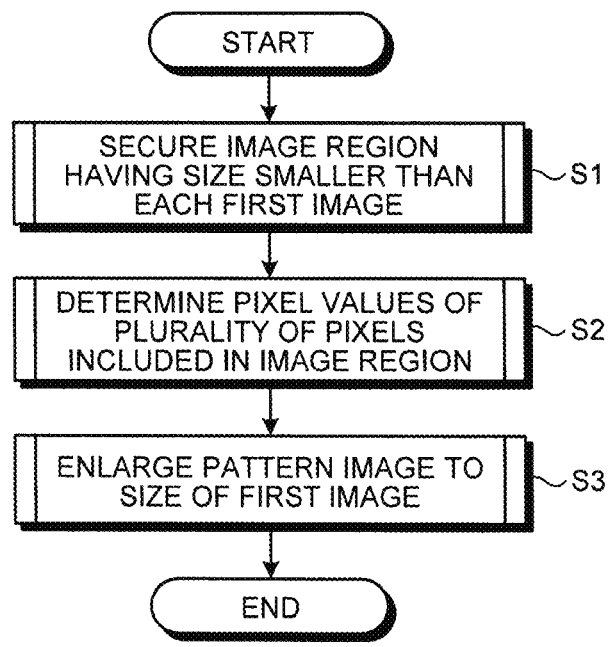
FIG. 5 is a diagram for explaining one example of a method for generating a first image.
FIG. 6 is a flowchart illustrating one example of a process that an acquisition unit performs.

As one example, an exemplary case is described where a first image corresponding to a certain spatial frequency is generated. This example is described on the assumption that the size of each first image is 6 pixels in the horizontal direction (right-to-left direction) by 4 pixels in the vertical direction (top-to-bottom direction). However, the size of each first image is not limited thereto. As illustrated in FIG. 5, the acquisition unit 110 secures an image region having a size (3 pixels in the horizontal direction by 2 pixels in the vertical direction in the example of FIG. 5) one half of the desired size of each first image. Subsequently, the acquisition unit 110 generates the original image by determining individual pixel values of a plurality of pixels (3×2=6 pixels) included in this image region by using random numbers or the like. In the example of FIG. 5, it is assumed that each image has 256 gray levels in gray scale, and that a pixel value of each pixel is set to either 0 (the lowest gray level value) or 255 (the highest gray level value). The setting of pixel values is not limited to selecting one of the two values that are "0" indicating the lowest gray level and "255" indicating the highest gray level. In one implementation, any value may be selected from the 256 levels. Furthermore, the same processing can be equally applied to a color image including image pixels of a plurality of colors and to a monochrome image in black and white.

The acquisition unit 110 then doubles the horizontal size and the vertical size of the original image to enlarge the original image to the desired size of the first image. Consequently, a pattern image representing a spatial frequency (corresponding to the certain spatial frequency) one half of that of the original image can be generated as the first image. In this example, interpolation using the nearest neighbor method is performed. However, the embodiment is not limited thereto. In one implementation, an interpolation process such as a linear enlargement method (a bilinear method) or a cubic interpolation method (a bicubic method) may be performed. In the example of FIG. 5, as a result of doubling both of the horizontal size and the vertical size, the enlarged image can be treated as a pattern image (the first image) that represents a spatial frequency one half of that of the original image.

FIG. 6 is a flowchart illustrating one example of a process that the acquisition unit 110 performs. As illustrated in FIG. 6, the acquisition unit 110 secures an image region having a size smaller than the size (a desired size) of each of the first image (Step S1). The acquisition unit 110 then randomly determines pixel values of a plurality of pixels included in the image region by use of random numbers (Step S2), thereby generating an original image. The acquisition unit 110 then enlarges the size of the generated original image to the size of the first image (Step S3). Consequently, a pattern image representing one spatial frequency (a spatial frequency one half of that of the original image) of a plurality of spatial frequencies can be generated as the first image.

In this example, a pattern appearing in the first image is an irregular pattern. However, the embodiment is not limited thereto, and a pattern appearing in the first image may be a regular pattern. For example, the acquisition unit 110 may generate each first image by: generating an original image by determining, according to a certain rule, pixel values of a plurality of pixels included in an image region having a size different from the size of the first image; and resizing the original image to the size of the first image. The certain rule can be set to any rule. For example, in one implementation, the pixel values of the respective pixels in the image region may be determined so that columns composed of sets of pixels representing the highest gray level and columns composed of sets of pixels representing the lowest gray level can be alternately arranged. In another implementation, the pixel values of the respective pixels in the image region may be determined so that pixels representing the highest gray level and pixels representing the lowest gray level can be alternately arranged both in the row direction and in the column direction, for example.

In this embodiment, the acquisition unit 110 generates a plurality of first images that correspond to a plurality of spatial frequencies on a one-to-one basis. However, this embodiment is not limited thereto. In one implementation, the acquisition unit 110 may acquire a plurality of previously generated first images from an external server apparatus (or an external storage device), an internal memory inside the pattern projecting apparatus 10, or the like. Any method may be used as a method for generating a plurality of first images that correspond to a plurality of spatial frequencies on a one-to-one basis. For example, in one implementation, a plurality of spatial frequencies may correspond to a plurality of desired distances on a one-to-one basis. In other words, in one implementation, a plurality of spatial frequencies corresponding to the respective distances may be set (previously set based on, for example, an experiment or the like) so that, when the image-capturing distance is one distance, a component of a spatial frequency corresponding to the one distance can appear as a feature (can be recognized by an observer). Note that the appearance of an image displayed on the subject tool (a target object) 30 changes depending not only on the image-capturing distance but also on other factors such as the focal length of the camera and the degree of blurring. Therefore, it is desirable that these factors be taken into consideration in selecting the spatial frequencies.

Figure 7:
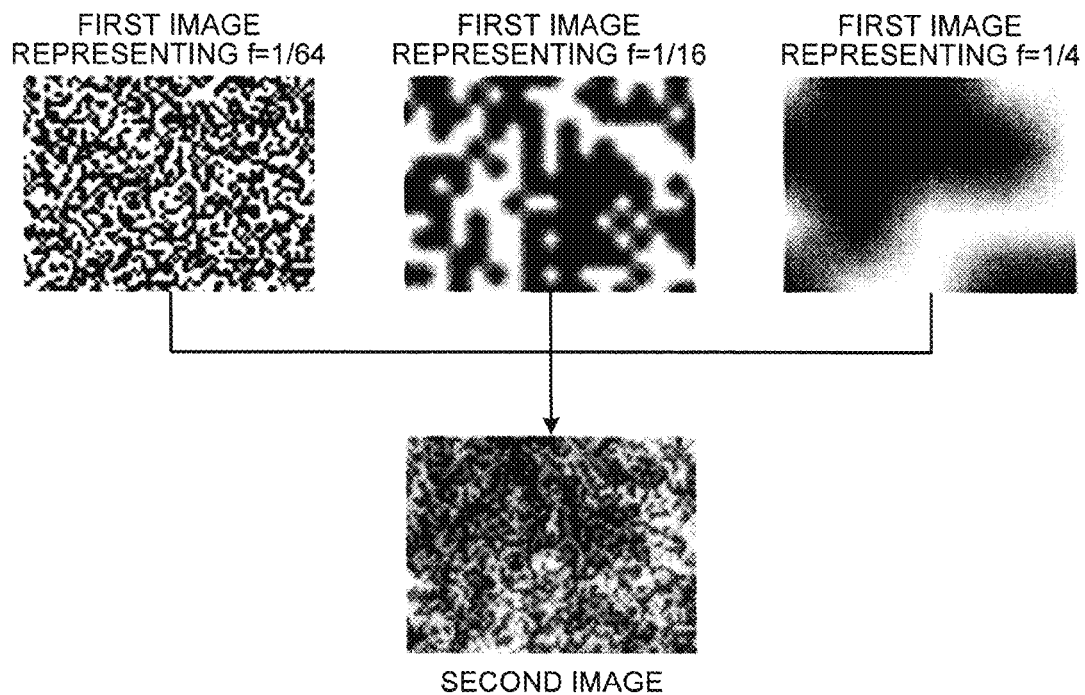
FIG. 7 is a diagram for explaining one example of a method for generating a second image.

With reference to FIG. 4 again, further description is given. The generation unit 120 combines the first images acquired by the acquisition unit 110 to generate the second image. In this embodiment, the generation unit 120 generates the second image by finding and setting, for each set of corresponding pixels included in the respective first images, the average of luminance values of these pixels in the respective first images as luminance values of corresponding pixels in the second image. For example, as illustrated in FIG. 7, it is assumed that the acquisition unit 110 has generated a first image representing a partial frequency f=1/64, a first image representing a partial frequency f=1/16, and a first image representing a partial frequency f=1/4. In this example, a plurality of first images generated by the acquisition unit 110 have the same size. With respect to each set of corresponding pixels included in the respective three first images, the average of luminance values of these pixels in the respective three first images is obtained. The second image (a composite image) can then be generated by setting the pixel value of each pixel in an image region to the average of the luminance values of pixels in the respective three first images that correspond to the each pixel, the image region having the same size as the first images.

Figure 8:
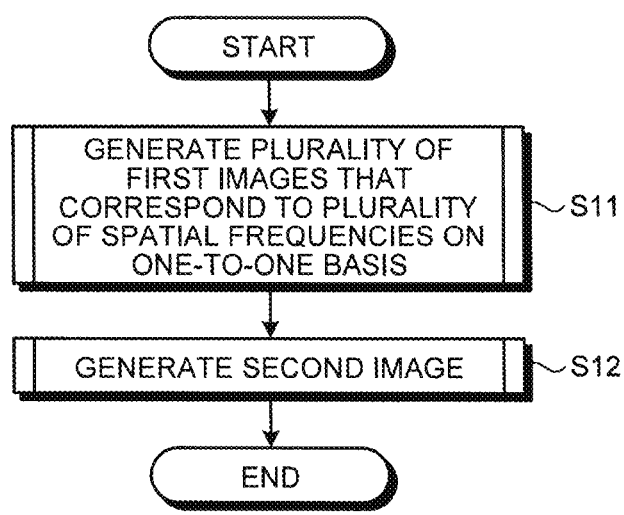
FIG. 8 is a flowchart illustrating exemplary operation of the pattern projecting apparatus.

FIG. 8 is a flowchart illustrating exemplary operation that the pattern projecting apparatus 10 performs when generating the second image. As illustrated in FIG. 8, in the first place, the acquisition unit 110 generates a plurality of first images that correspond to a plurality of spatial frequencies on a one-to-one basis (Step S11). The specific details of this step are as described above. Subsequently, the generation unit 120 combines the first images generated at Step S11 to generate the second image (Step S12). The specific details of this step are as described above.

With reference to FIG. 4 again, further description is given. The output controlling unit 130 controls output based on the second image generated by the generation unit 120. In this embodiment, the output controlling unit 130 controls the projection unit 104 to project, to the subject tool 30, light based on the second image generated by the generation unit 120.

In this embodiment, the description has been given with a pattern projecting apparatus taken as an example of an image processing apparatus to which the present invention is applied. However, the kind of image processing apparatus to which the present invention is applied can be changed to any desired one. In essence, in one implementation, an image processing apparatus to which the present invention is applied only needs to include at least the above-described function corresponding to the acquisition unit 110 and the above-described function corresponding to the generation unit 120.

Furthermore, a form of the output based on the second image generated by the generation unit 120 depends on the kind of image processing apparatus to which the present invention is applied. For example, when an image processing apparatus to which the present invention is applied is a printing apparatus, which is one form of an image forming apparatus, the output controlling unit 130 may control a printing engine unit to form, on a recording medium (such as a sheet of paper or a metal plate), the second image generated by the generation unit 120 in one implementation. For example, when the recording medium is formed of an aluminum plate, the aluminum plate having the second image printed thereon may be used as the subject tool 30. For example, when the recording medium is formed of a sheet of paper or the like, the subject tool 30 may be prepared by attaching, onto a surface of a plate-like member, the sheet of paper having the second image printed thereon, in one implementation.

Furthermore, for example, an image processing apparatus to which the present invention is applied may be an apparatus that produces a plate-like template (for example, a light-blocking template) based on the second image generated by the image processing apparatus itself. In this case, in one implementation, with a light source positioned so as to face a target object (for example, the subject tool 30) across the apparatus, a projection image according to the template may be formed on a surface of the target object with light emitted from the light source toward the target object. Instead of the plate-like template, a self-luminous plate can be used. Specifically, instead of the plate-like template, what is called electronic paper can be used.

As described above, in this embodiment, the second image obtained by combining a plurality of first images that correspond to a plurality of spatial frequencies on a one-to-one basis is formed as a pattern image to be displayed on the subject tool 30. Consequently, the embodiment can exhibit the beneficial effect of enabling feature points to be stably extracted despite a change in image-capturing distance because a pattern corresponding to a spatial frequency that is suitable for the changed image-capturing distance appears as a feature.

Although the embodiment according to the present invention is described above, the present invention is not limited to the above-described embodiment as it is, and can be implemented in practice with the components of the embodiment being modified without departing from the scope thereof. Furthermore, a variety of inventions can be formed by appropriate combinations of a plurality of components from those disclosed in the above-described embodiment. For example, some components may be excluded from the complete set of components described in the embodiment.

Figure 9:
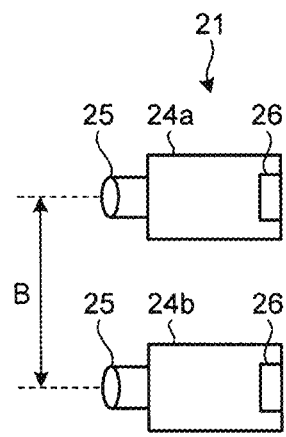
FIG. 9 is a diagram illustrating one example of the configuration of a system according to a modification.

For example, as in the case of the configuration described in the specification of Japanese Patent Application No. 2014-208897, images are captured while the distance (the image-capturing distance) between the three-dimensional measurement apparatus 20 and the subject tool 30 having the above-described second image displayed thereon is changed, and correction parameters can be calculated with respect to each of a plurality of distances, based on captured images (captured images each containing an image of the subject tool 30 having the second image displayed thereon) obtained by the image capturing at the each distance and on the each distance (a known value). In essence, in one implementation, the calculation unit 22 only needs to calculate, based on a captured image containing a target object and on the distance (a known distance) between the image capturing unit 21 and the target object, correction parameters for correcting captured images obtained by image capturing with the image capturing unit 21. For example, as illustrated in FIG. 9, the image capturing unit 21 is configured to include a pair of a first camera 24*a* and a second camera 24*b* that are positioned with a certain distance (a base-line length) B in the horizontal direction therebetween. Each of the first camera 24*a* and the second camera 24*b* includes an imaging lens 25 and an imaging element (for example, a charge-coupled device (CCD) image sensor) 26, and an image of a subject, which is formed by the imaging lens 25, is captured by an imaging surface of the imaging element 26.

Figure 10:
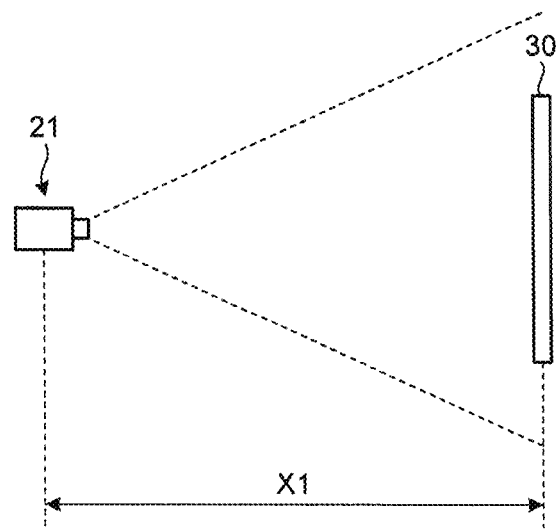
FIG. 10 is a schematic view illustrating one example of how an image of a subject tool according to the modification is captured.
Figure 11:
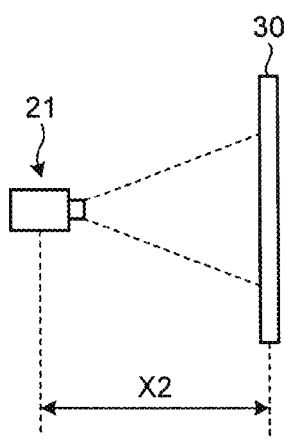
FIG. 11 is a schematic view illustrating one example of how an image of the subject tool according to the modification is captured.

First of all, as illustrated in FIG. 10, under the condition that the distance between the subject tool 30 having the second image displayed thereon and the image capturing unit 21 is set to a distance X1 (for example, 5 meters), the first camera 24*a* and the second camera 24*b* are caused to capture images. Thereafter, as illustrated in FIG. 11, under the condition that the distance between the subject tool 30 having the second image displayed thereon and the image capturing unit 21 is set to a distance X2 (for example, 1 meter), the first camera 24*a* and the second camera 24*b* are caused to capture images. Correction parameters can be calculated based on the images captured at these distances.

Figure 12:
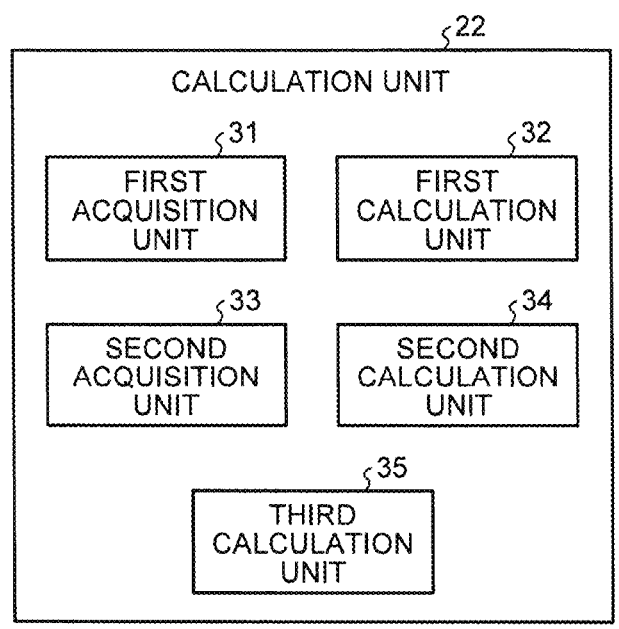
FIG. 12 is a diagram illustrating exemplary functions in a calculation unit according to the modification.

FIG. 12 is a diagram illustrating exemplary functions in the calculation unit 22 according to this modification. As illustrated in FIG. 12, the calculation unit 22 includes a first acquisition unit 31, a first calculation unit 32, a second acquisition unit 33, a second calculation unit 34, and a third calculation unit 35.

The first acquisition unit 31 acquires: a captured image (sometimes referred to as "first captured image" hereinafter) obtained by capturing, with the first camera 24*a*, an image of the subject tool 30 (subject tool 30 having the second image displayed thereon) a first distance X1 (5 meters in this example) away from the image capturing unit 21; and a captured image (sometimes referred to as "second captured image" hereinafter) obtained by capturing an image of the above subject tool 30 with the second camera 24*b*.

Based on the first distance X1 (5 meters in this example), the first captured image, and the second captured image, the first calculation unit 32 calculates first corresponding data for at least one of the first captured image and the second captured image, the first corresponding data having a plurality of sets of coordinate values associated with sets of target coordinate values provided for obtaining ideal parallax, the respective sets of coordinate values corresponding to feature points on a one-to-one basis in a first image region representing an image region (the central region in this modification) containing an image of the subject tool 30 having the second image displayed thereon. Here, when images of the subject tool 30 are individually captured by the first camera 24*a* and the second camera 24*b*, an image of the subject tool 30 contained in the first captured image and an image of the subject tool 30 contained in the second captured image appear different (are viewed with parallax) because the positions of the first camera 24*a* and the second camera 24*b* are different. More specifically, a position in the first captured image and a position in the second captured image that correspond to the same feature point in the second image displayed on the subject tool 30 are apart from each other (different in position from each other) by a distance corresponding to the parallax.

With respect to each of a plurality of feature points included (contained as an image) in the above-described first image region on the first captured image, the first calculation unit 32 specifies coordinate values on the first captured image that correspond to the feature point, and coordinate values on the second captured image that correspond thereto, and finds an ideal positional difference therebetween. As a method (a method for finding corresponding points) for specifying coordinate values in the first captured image that correspond to a feature point, and coordinate values in the second captured image that correspond to the same feature point, various publicly known techniques (such as for example, the SAD method and the phase-only correlation (POC) method) are applicable. Thereafter, with respect to each of the feature points contained in the first image region, the first calculation unit 32 finds ideal coordinate values (i.e., a position provided for obtaining ideal parallax, sometimes referred to as "target coordinate values" hereinafter).

In the above-described manner, based on the first distance X1, the first captured image, and the second captured image, the first calculation unit 32 calculates first corresponding data with respect to each of the first captured image and the second captured image, the first corresponding data having a plurality of sets of coordinate values (coordinate values on the uncorrected captured images) associated with sets of target coordinate values provided for obtaining ideal parallax, the sets of coordinate values corresponding to a plurality of feature points contained in the above-described first image region. In this example, the first calculation unit 32 calculates both of the first corresponding data corresponding to the first captured image and the first corresponding data corresponding to the second captured image. However, this modification is not limited to this example. For example, in one implementation, the first calculation unit 32 may calculate only the first corresponding data that corresponds to any one of the first captured image and the second captured image.

In essence, in one implementation, the first calculation unit 32 only needs to calculate, based on the first distance X1, the first captured image, and the second captured image, first corresponding data with respect to at least one of the first captured image and the second captured image, the first corresponding data having a plurality of sets of coordinate values associated with sets of target coordinate values provided for obtaining ideal parallax, the sets of coordinate values corresponding on a one-to-one basis to a plurality of feature points contained in the first image region containing an image of a target object having the second image displayed thereon (in this example, the subject tool 30 having the second image displayed thereon).

Further description is given in connection with FIG. 12. The second acquisition unit 33 acquires: a third captured image obtained by capturing, with the first camera 24a, an image of the subject tool 30 (subject tool 30 having the second image displayed thereon) a second distance X2 (1 meter in this example) away from the image capturing unit 21; and a fourth captured image obtained by capturing, an image of the above subject tool 30 with the second camera 24b. In this modification, the first acquisition unit 31 and the second acquisition unit 33, which are described above, are separate components. However, the modification is not limited to this case, and, for example, the first acquisition unit 31 and the second acquisition unit 33 may be the same component. In other words, in one implementation, any one of the first acquisition unit 31 and the second acquisition unit 33 may be configured to functionally double as the other.

Based on the second distance X2 (1 meter in this example), the third captured image, and the fourth captured image, the second calculation unit 34 calculates second corresponding data with respect to at least one of the third captured image and the fourth captured image, the second corresponding data having a plurality of sets of coordinate values associated with sets of target coordinate values provided for obtaining ideal parallax, the sets of coordinate values corresponding on a one-to-one basis to a plurality of feature points contained in a second image region (an image region other than the central region in the captured image in this modification). The second image region is within an image region containing the subject tool 30 having the second image displayed thereon and is other than a region corresponding to the above-described first image region.

A method for calculating the second corresponding data is basically the same as the above-described method for calculating the first corresponding data. Based on the second distance X2, the third captured image, and the fourth captured image, the second calculation unit 34 according to this modification generates second corresponding data with respect to each of the third captured image and the fourth captured image, the second corresponding data having a plurality of sets of coordinate values (coordinate values on the captured images before these images are corrected) associated with sets of target coordinate values provided for obtaining ideal parallax, the sets of coordinate values corresponding to a plurality of feature points contained in the above-described second image region.

In this example, the second calculation unit 34 generates both of the second corresponding data corresponding to the third captured image and the second corresponding data corresponding to the fourth captured image. However, this modification is not limited to this example. For example, in one implementation, the second calculation unit 34 may generate only the second corresponding data that corresponds to any one of the third captured image and the fourth captured image. In essence, in one implementation, the second calculation unit 34 only needs to calculate, based on the second distance X2, the third captured image, and the fourth captured image, second corresponding data with respect to at least one of the third captured image and the fourth captured image, the second corresponding data having a plurality of sets of coordinate values in association with sets of target coordinate values provided for obtaining ideal parallax, the sets of coordinate values corresponding on a one-to-one basis to a plurality of feature points contained in the second image region. The second image region is within an image region containing an image of a target object (in this example, the subject tool 30 having the second image displayed thereon) having the second image displayed thereon, and is other than a region corresponding to the above-described first image region.

Further description is given in connection with FIG. 12. Based on the above-described first corresponding data and the above-described second corresponding data, the third calculation unit 35 calculates correction parameters for correcting a captured image obtained by image capturing with the first camera 24a or the second camera 24b. More specifically, from a plurality of combinations each consisting of a set of coordinate values contained in the above-described first corresponding data and in the above-described second corresponding data and a set of target coordinate values associated thereto, the third calculation unit 35 uses the method of least squares to calculate, as the correction parameter, a coefficient of a correction formula expressing the relation between coordinate values on captured images obtained by image capturing with either the first camera 24a or the second camera 24b and target coordinate values. The correction method can be expressed as, for example, Formula 1 given below. In Formula 1, the variable x represents a coordinate value in the right-to-left direction on an uncorrected captured image, and the variable y represents a coordinate value in the top-to-bottom direction on an uncorrected captured image. Furthermore, the variable x' represents a target coordinate value in the right-to-left direction on a captured image, and the variable y' represents a target coordinate value in the top-to-bottom direction on a captured image. The correction formula is not limited to an affine transformation formula such as Formula 1 given below, and may take another form.

$$x=a+bx'+cy'$$
$$y=d+ex'+fy' \quad (1)$$

In this modification, the third calculation unit 35 uses the method of least squares to calculate coefficients a to f (which can be considered as first correction parameters) of a correction formula (sometimes referred to as "first correction formula" in the following description) that represents the relation between sets of coordinate values on captured images obtained by image capturing with the first camera 24a and target coordinate values, from a plurality of data sets (combinations each consisting of a set of uncorrected coordinate values and a set of target coordinate values) contained in the first corresponding data corresponding to the above-described first captured image, and a plurality of data sets contained in the second corresponding data corresponding to the above-described third captured image. The third calculation unit 35 uses the method of least squares to further calculate coefficients a to f (which can be considered as second correction parameters) of a correction formula (sometimes referred to as "second correction formula" in the following description) that represents the relation between sets of coordinate values on captured images obtained by image capturing with the second camera 24b and target coordinate values, from a plurality of data sets contained in the first corresponding data corresponding to the above-described second captured image, and a plurality of data sets contained in the second corresponding data corresponding to the above-described fourth captured image.

In the above-described manner, the third calculation unit 35 obtains the first correction formula representing the relation between coordinate values on captured images obtained by image capturing with the first camera 24a and target coordinate values, and the second correction formula representing the relation between coordinate values on captured images obtained by image capturing with the second camera 24b and target coordinate values. The measurement unit 23 then uses the first correction formula to correct coordinate values on captured images obtained by image capturing with the first camera 24a, thereby obtaining a first corrected image. The measurement unit 23 further uses the second correction formula to correct coordinate values on captured images obtained by image capturing with the second camera 24b, thereby obtaining a second corrected image. The measurement unit 23 then calculates parallax from the first corrected image and the second corrected image, and can generate and output a parallax image (a depth map) representing respective depths of the pixels in any one of the first corrected image and the second corrected image that serves as a reference.

In this modification also, feature points can be stably extracted in image capturing at any distance (X1 or X2) because the second image is generated so as to contain a spatial frequency component corresponding the distance X1 and a spatial frequency component corresponding the distance X2. Furthermore, in this modification, one advantage is that a simplified configuration can be adopted because only one subject tool 30 is needed for calibration.

Figure 13:
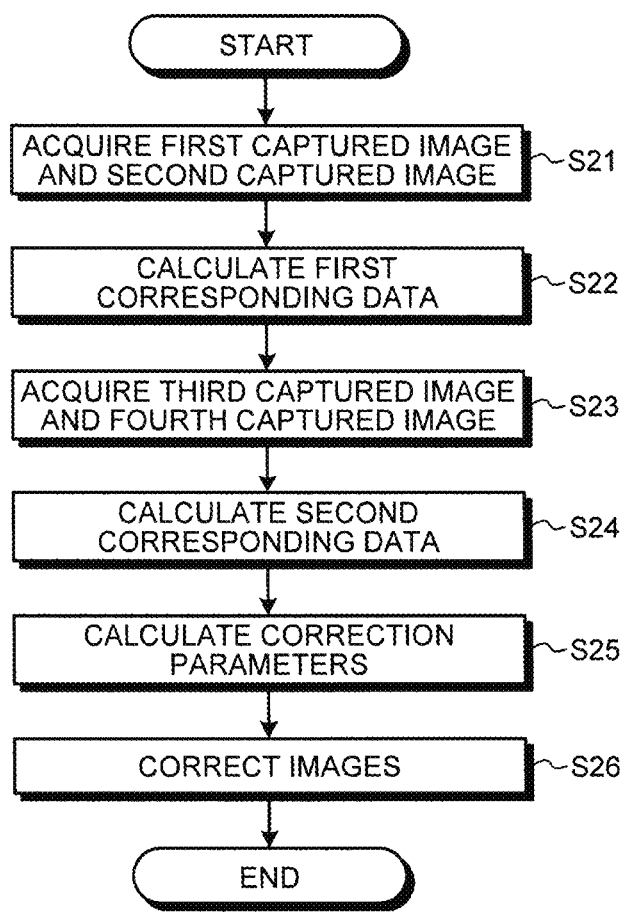
FIG. 13 is a flowchart illustrating exemplary operation of the calculation unit according to the modification.

FIG. 13 is a flowchart illustrating exemplary operation of the calculation unit 22 according to the modification.

First of all, the first acquisition unit 31 acquires a first captured image obtained by capturing, with the first camera 24a, an image of a subject tool 30 (a subject tool 30 having the second image displayed thereon) a first distance X1 (5 meters in this example) away from the image capturing unit 21, and a second captured image obtained by capturing an image of the same subject tool 30 with the second camera 24b (Step S21). Subsequently, the first calculation unit 32 calculates the above-described first corresponding data (Step S22), based on the first captured image and the second captured image that have been acquired at Step S21 and on the known first distance X1 (5 meters in this example). A method for calculating this first corresponding data is as described above.

Subsequently, the second acquisition unit 33 acquires a third captured image obtained by capturing, with the first camera 24a, an image of the subject tool 30 (subject tool 30 having the second image displayed thereon) a second distance X2 (1 meter in this example) away from the image capturing unit 21, and a fourth captured image obtained by capturing an image of the same subject tool 30 with the second camera 24b (Step S23). Subsequently, the second calculation unit 34 calculates the above-described second corresponding data (Step S24), based on the third captured image and the fourth captured image that have been acquired in Step S23 and on the known second distance X2 (1 meter in this example). A method for calculating this second corresponding data is as described above.

Subsequently, the third calculation unit 35 calculates correction parameters (Step S25), based on the first corresponding data calculated at Step S22 and the second corresponding data calculated at Step S24. As described above, based on the first corresponding data corresponding to the first captured image and the second corresponding data corresponding to the third captured image, the third calculation unit 35 calculates, as correction parameters, coefficients of the first correction formula expressing the relation between coordinate values on captured images in image capturing with a first camera 24a and target coordinate values. Based on the first corresponding data corresponding to the second captured image and the second corresponding data corresponding to the fourth captured image, the third calculation unit 35 further calculates, as correction parameters, coefficients of the second correction formula expressing the relation between coordinate values on captured images in image capturing with a second camera 24b and target coordinate values.

The measurement unit 23 corrects (calibrates) captured images by using the correction parameters calculated at Step S25 (Step S26). As described above, the measurement unit 23 uses the first correction formula to correct coordinate values of a capture image obtained by image capturing with the first camera 24a, thereby obtaining the first corrected image. The measurement unit 23 further uses the second correction formula to correct coordinate values on a captured image obtained by image capturing with the second camera 24b, thereby obtaining a second corrected image.

The above-described calibration method (method for correcting coordinate values of a captured image) can be considered as a calibration method for calibrating a stereo camera by using a calibration pattern (including, for example, a chart), the calibration method including a first image capturing step, a second image capturing step, and a calibration step while employing, as the calibration pattern, a calibration pattern that is based on the second image generated by combining a plurality of first images that correspond to a plurality of spatial frequencies on a one-to-one basis. The first image capturing step is obtaining images (corresponding to the first captured image and the second captured image in the above examples) by image capturing at a first distance, the images each containing the calibration pattern. The second image capturing step is obtaining images (corresponding to the third captured image and the fourth captured image in the above examples) by image capturing at a second distance different from the first distance, the images each containing the calibration pattern. The calibration step is calibrating the stereo camera, based on the images obtained at the first distance and the images obtained at the second distance.

The examples of the pattern projecting apparatus 10 in the above-described embodiment and modification can be used not only for calibration of a stereo camera but also for calculation of parallax when a stereo camera is in operation. For example, the pattern projecting apparatus 10 can also be used in a system using pattern projection that includes a stereo camera, such as the one disclosed in Japanese Patent Application Publication No. 2007-101276. More specifically, the pattern projecting apparatus 10 may be used in a system that calculates parallax based on a projected pattern, the system being configured to use, as the pattern, a pattern based on a second image generated by combining a plurality of first images that correspond to a plurality of spatial frequencies on a one-to-one basis and calculate parallax based on the pattern.

(Computer Program)

A computer program to be executed in the pattern projecting apparatus 10 may be recorded and provided in a non-transitory computer-readable recording medium such as a compact disc read only memory (CD-ROM), a flexible disk (FD), a compact disc recordable (CD-R), a digital versatile disc (DVD), or a universal serial bus (USB) as a file in an installable form or an executable form, or may be provided or distributed via a network such as the Internet. Various computer programs may be previously embedded in a read only memory (ROM) or the like having the computer programs and provided.

According to the embodiments of the present invention, feature points can be stably extracted despite a change in image-capturing distance of patterns.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A calibration method for calibrating a stereo camera, the method comprising:
   printing a pattern including a second image generated by combining pixel values at corresponding positions in a plurality of first images, each first image having a different spatial frequency of a plurality of spatial frequencies, and obtaining a printed image of the pattern;
   capturing the printed image with the stereo camera, and obtaining a captured image of the printed image; and
   performing calibration of the stereo camera based on the captured image.

2. The calibration method according to claim 1, further comprising generating the second image by obtaining and setting, for each set of corresponding pixels included in the respective first images, an average of luminance values of the pixels in the respective first images.

3. The calibration method according to claim 1, wherein the performing step comprises performing calibration of the stereo camera based on the captured image of the printed image and a distance between the stereo camera and the printed image.

4. The calibration method according to claim 1, wherein the first images are images corresponding to a plurality of distances between the stereo camera and the printed image, respectively.

5. The calibration method according to claim 1, wherein the pattern is printed on a sheet of paper.

6. The calibration method according to claim 1, wherein the pattern is printed on a metal plate.

7. The calibration method according to claim 1, wherein each of the first images includes a set of pixels having values that are set randomly.

8. The calibration method according to claim 1, wherein the second image includes a set of pixels having values that are set to form a pattern.

9. The calibration method according to claim 1, wherein the performing step comprises calculating correction parameters for use in correcting the captured images obtained with the stereo camera.

10. The calibration method of claim 1, further comprising the step of generating the second image by combining the pixel values at the corresponding positions in the plurality of first images.

11. The calibration method according to claim 1, wherein the second image includes a set of pixels having values that are non-random.

12. A calibration method for calibrating a stereo camera, the method comprising:
    printing a pattern including each pixel of a second image generated by combining a plurality of first images, each first image having a different spatial frequency of a plurality of spatial frequencies, and obtaining a printed image of the pattern;
    capturing the printed image with the stereo camera, and obtaining a captured image of the printed image; and
    performing calibration of the stereo camera based on the captured image.

13. A calibration method for calibrating a stereo camera, the method comprising:
    printing a pattern including a second image generated by combining pixel values at corresponding positions in a plurality of first images that correspond to a plurality of spatial frequencies on a one-to-one basis, and obtaining a printed image of the pattern;
    capturing the printed image with the stereo camera, and obtaining a captured image of the printed image; and
    performing calibration of the stereo camera based on the captured image,
    wherein the method further comprises generating the second image by obtaining and setting, for each set of corresponding pixels included in the respective first images, an average of luminance values of the pixels in the respective first images.

* * * * *